United States Patent [19]

Suzuki et al.

[11] Patent Number: 4,941,973
[45] Date of Patent: Jul. 17, 1990

[54] APPARATUS FOR REMOVING IRON OXIDES FROM WATER IN FEED WATER SYSTEM OF A POWER PLANT

[75] Inventors: Mamoru Suzuki; Katsumi Suzuki; Kazutoshi Itoh; Akira Minato; Tsuyoshi Kambayashi; Yoshiyuki Hoshino, all of Hitachi, Japan

[73] Assignee: Hitachi, Ltd., Tokyo, Japan

[21] Appl. No.: 213,142

[22] Filed: Jun. 29, 1988

Related U.S. Application Data

[63] Continuation of Ser. No. 488,429, Apr. 22, 1983, abandoned, which is a continuation of Ser. No. 276,840, Jun. 24, 1981, abandoned.

[30] Foreign Application Priority Data

Jun. 25, 1980 [JP] Japan .................................. 55-85137
Jul. 18, 1980 [JP] Japan .................................. 55-97535

[51] Int. Cl.$^5$ .............................................. B01D 21/00
[52] U.S. Cl. .................................... 210/175; 210/188; 210/222

[58] Field of Search .............. 210/222, 223, 175, 188; 122/379, 382, 489

[56] References Cited

U.S. PATENT DOCUMENTS

| | | | |
|---|---|---|---|
| 2,236,769 | 4/1941 | Armbruster | 210/223 |
| 2,707,557 | 5/1955 | Spodig | 210/222 X |
| 3,841,486 | 10/1974 | Heitmann et al. | 210/222 X |

Primary Examiner—Frank Spear
Attorney, Agent, or Firm—Antonelli, Terry, Stout & Kraus

[57] ABSTRACT

Magnetic attracting means, especially a permanent magnet, is disposed in a high pressure feed water heater drain pipe line or air separator water tank of feed water and condensed water systems in a thermoelectric power plant. By adoption of this arrangement, iron oxides contained in water in the feed water and condensed water systems can effectively be attracted and removed by this magnetic attracting means.

19 Claims, 5 Drawing Sheets

APPARATUS FOR REMOVING IRON OXIDES FROM WATER IN FEED WATER SYSTEM OF A POWER PLANT

This is a continuation of application Ser. No. 488,429, filed Apr. 22, 1983, which is a continuation of application Ser. No. 276,840, filed June 24, 1981, both now abandoned.

BACKGROUND OF THE INVENTION

1. Field of the Invention

The present invention relates to an apparatus for capturing and removing iron oxides contained in water in feed water and condensed water systems, that is, a feed water system and a condensed water system, in a thermoelectric power plant or other electric power plant.

2. Description of the Prior Art

Most of main machines, apparatuses and pipe lines in a thermoelectric power plant or other electric power plant are ordinarily formed of iron and steel materials, and high purity water is used as a circulation fluid and the iron concentration in the system water is controlled and maintained by a water treatment of adding a minute amount of a chemical to water for preventing corrosion of constituent materials. However, while the system water used for a long time, iron is gradually dissolved out from the iron and steel materials and is accumulated in the system water in the form of iron oxides (mainly ferromagnetic $Fe_3O_4$ and $\gamma\text{-}Fe_2O_3$). These iron oxides are deposited on boiler water walls, inner surfaces of pipes, turbines, high pressure feed water heaters, feed water flow meters and various valves and cause various troubles such as (1) over-heating of pipes, (2) reduction of the turbine output, (3) overloading of pumps by increase of the pressure difference and (4) incorrect indication of flow meters. Accordingly, in order to improve the reliability of the electric power plant and increase the output thereof, it is very important to remove iron oxides from water in feed water and condensed water systems.

As means for attaining an anticorrosive effect in a drain pipe line system in a thermoelectric power plant, there have been considered (1) a method in which the pH value of water in the drain system is increased and escape of ammonia is prevented, (2) a method in which an appropriate amount of oxygen is injected in bleeder pipes, and (3) a method in which hydrogen peroxide and ammonia are injected into bleeder pipes. In connection with the method (1), ammonia injecting apparatuses have been attached to drain systems in some plants, but the effect attainable by injection of ammonia is indefinite and this method is not ordinarily adopted. The methods (2) and (3) were tried and experiments were made in German power plants, but these methods are not ordinarily adopted. Although various researches have thus been made on the method for attaining an anticorrosive effect in a drain pipe line system, a practically applicable method has not been developed and at the present, it is impossible to prevent iron from being dissolved out from drain pipe line systems. Furthermore, removal of iron oxides present in a drain pipe line system has not been examined.

SUMMARY OF THE INVENTION

It is therefore a primary object of the present invention to provide an apparatus for removing iron oxides, which can effectively remove iron oxides contained in water in feed water and condensed water systems in an electric power plant and which prevents deposition of iron oxides on other water pipes and water walls to improve the reliability of the electric power plant.

We checked iron-forming points in feed water and condensed water systems and analyzed the adhering property of iron at high temperatures, and we obtained a novel finding that especially high effects can be attained when iron oxides are captured and removed in a high pressure feed water system. We have now completed the present invention based on this finding. According to the present invention, magnetic attracting means, for example, a permanent magnet, is disposed in a high pressure feed water heater drain system, that is, in a region of a high pressure feed water heater drain system and an air separator water tank disposed just downstream of the high pressure feed water heater. If the apparatus of the present invention is adopted, the permanent magnet effectively attracts iron oxides in an electric power plant and the attracted iron oxides can effectively be removed, and adhesion of iron oxides to other water pipes can be controlled to a minimum level.

DETAILED DESCRIPTION OF THE PREFERRED EMBODIMENTS

We checked iron-forming points and iron content-increasing points in water systems in an electric power plant and made investigations with a view to finding out iron-capturing and iron-removing points which would result in attainment of highest removal effects.

Figure 1:
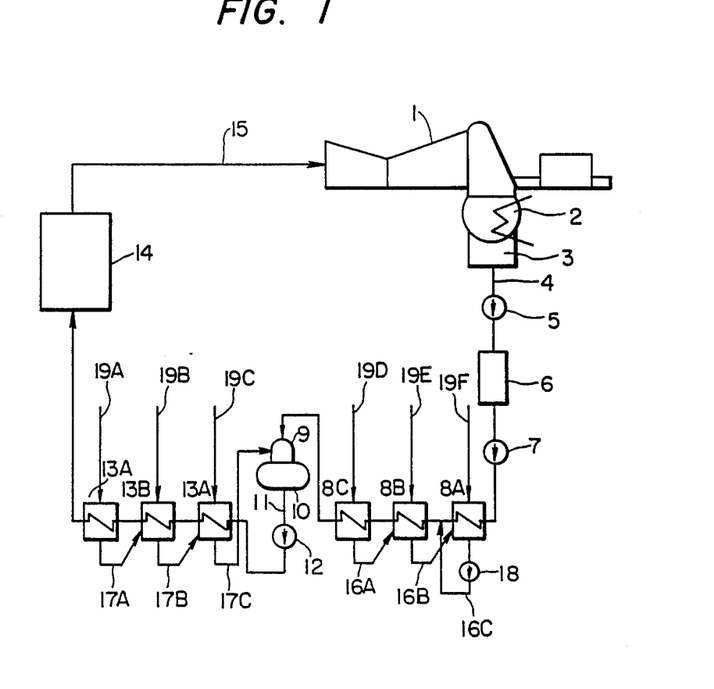
FIG. 1 is a schematic view of a thermoelectric power plant to which the present invention is applied.
Figure 2:
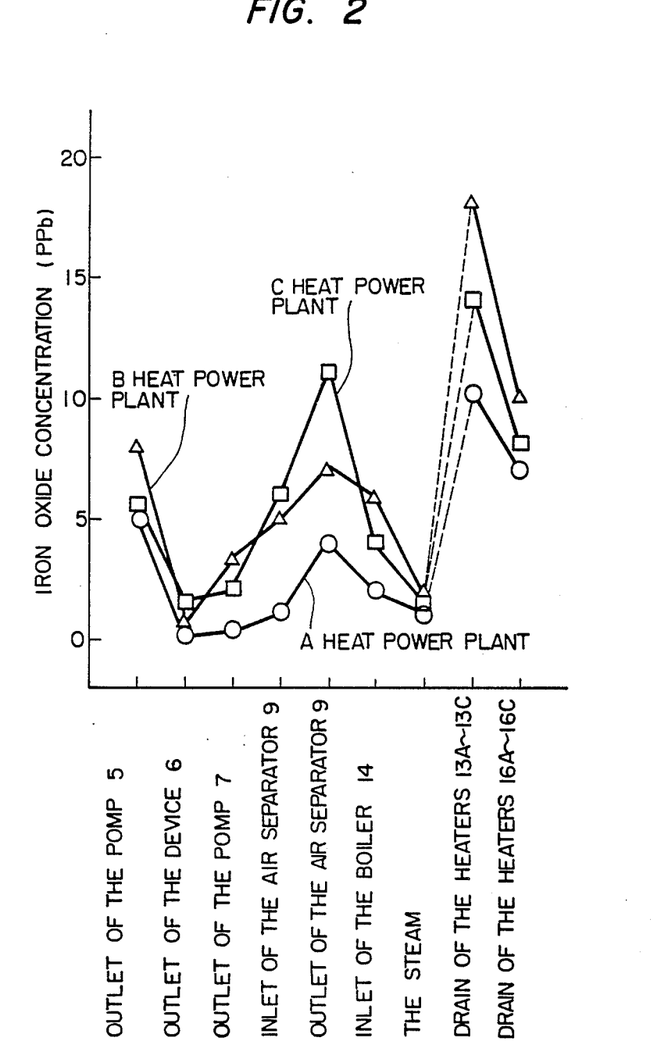
FIG. 2 is a graph showing the results of a comprehensive water analysis test conducted in an electric power plant.

Referring to FIG. 1 showing the system of a thermoelectric power plant, feed water is introduced into a boiler 14 through a condenser 2, a condensed water hot well 3, a condensed water pipe line 4, a condensed water pump 5, a condensed water desalting apparatus 6, a condensed water pressure elevating pump 7, low pressure feed water heaters 8A through 8C, an air separator 9, an air separator water tank 10, a feed water pipe line 11, a feed water pump 12 and high pressure feed water heaters 13A through 13C, and in the boiler 14, steam is generated and this steam passes through a steam pipe 15, drives a turbine 1 and returns to the condenser 2. Incidentally, reference numerals 16A through 16C represent low pressure feed water heater drain pipe lines, reference numerals 17A through 17C represent high pressure feed water heater drain pipe lines, reference numeral 18 represents a drain pump, and reference numerals 19A through 19F represent bleeding pipes from the turbine. In order to clarify iron-forming points in the system of the thermoelectric power plant, a comprehensive water analysis test was carried out in various power plants to obtain the results shown in FIG. 2. From the results shown in FIG. 2, it is seen that the iron content in the system water is reduced at the outlet of the condensed water desalting apparatus 6, but in the downstream portion, the iron content is increased to the point of the outlet of the deaerator 9. The iron content is reduced again in the boiler 14. Accordingly, water in the high pressure feed water heater drain to be introduced into the deaerator 9 was analyzed and a large quantity of iron was detected in this drain water. Although iron in the condensed water system is removed by the condensed water desalting apparatus 6, since high iron content water in the high pressure feed water heater drain pipe line is introduced into the air separator 9, this increased amount of iron adheres in the form of iron oxides to high pressure feed water heaters 13A through 13C, main feed water flow meter and boiler feed water adjusting valve which are disposed between the air separator 9 and the boiler 14, and the iron oxides which have been carried into the boiler 14 are deposited on the water wall of the boiler. Thus, it has been clarified that the cause of formation of iron is corrosion of the high pressure feed water heater drain pipe line system. More specifically, it has been clarified that since iron oxides which are deposited on the respective parts of the thermoelectric power plant are formed in the high pressure feed water heater drain pipe line system, highest removal effects can be attained if iron oxides are captured and removed in the high pressure feed water heater drain pipe lines 17A through 17C or the air separator water tank 10 disposed just downstream of said pipe lines 17A through 17C, to which tank the drain is recycled.

The present invention has been completed based on the results of the above analysis test and examination, and the present invention is characterized in that magnetic attracting means, especially a permanent magnet, is disposed in high pressure feed water heater drain pipe lines 17A through 17C or an air separator water tank 10 in a thermoelectric power plant system to capture and remove iron oxides.

Examples of the present invention will now be described with reference to the accompanying drawings. Examples I through III show embodiments where magnetic attracting means is disposed in the high pressure feed water heater drain pipe lines 17A through 17C, and Example IV illustrates an embodiment where magnetic attracting means is disposed in the air separator water tank 10.

EXAMPLE I

Figure 3:
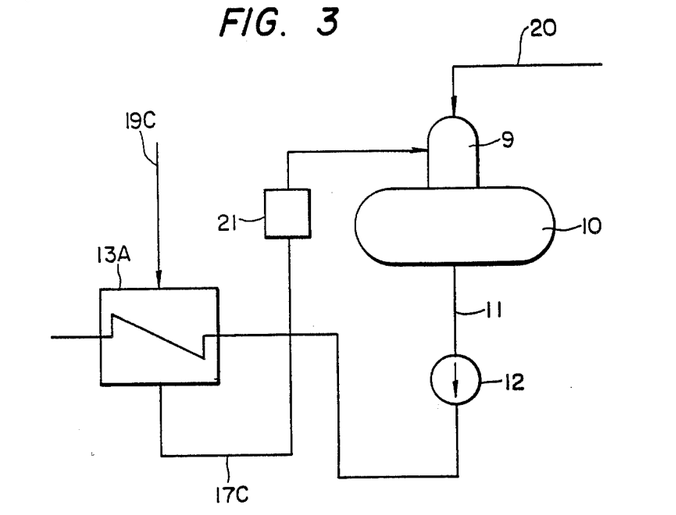
FIG. 3 is a schematic diagram illustrating one embodiment of the apparatus for removing iron oxides according to the present invention.
Figure 4:
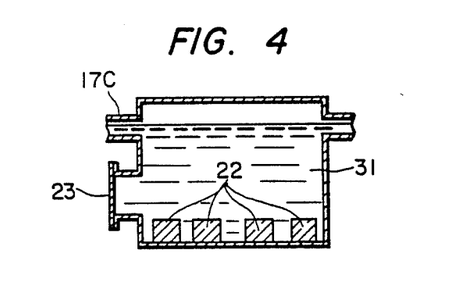
FIG. 4 is a sectional view of the iron oxide-removing apparatus shown in FIG. 3.

One embodiment of the apparatus for removing iron oxides according to the present invention is shown in FIGS. 3 and 4. Air in the turbine 1 is extracted from the turbine 1 through the bleeding pipe 19C and is used for heating the high pressure feed water heater 13A. The formed drain 31 is carried into the air separator 9 through the high pressure feed water heater drain pipe line 17C and is combined with feed water carried from the low pressure feed water heater 8C by the feed water pipe 20. Then, feed water is dearated and is carried to the high pressure feed water heater 13A through the air separator water tank 10, feed water pipe line 11 and feed water pump 12.

In this embodiment, a drain tank 21 is disposed in the high pressure feed water heater drain pipe line 17C connecting the high pressure feed water heater 13A to the air separator 9, and a permanent magnet 22 is arranged in this drain tank 21. By adoption of this arrangement, iron in the drain 31 which has been formed in the high pressure feed water heater drain pipe line system can be captured and removed, and high quality boiler feed water can be obtained. The permanent magnet 22 which has captured the iron oxides can be taken out from the tank 21 by opening a lid 23.

EXAMPLE II

Figure 5:
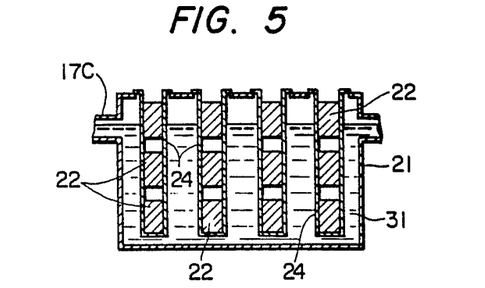
FIG. 5 is a sectional view illustrating another embodiment of the apparatus for removing iron oxides according to the present invention.

Another embodiment of the present invention is illustrated in FIG. 5. This embodiment is different from the embodiment of Example I in that a number of non-magnetic sheaths 24 having a permanent magnet 22 inserted therein are dismountably attached to the upper portion of the drain tank 21. In this apparatus, the iron oxides in the drain 31 are captured on the peripheral surfaces of the sheaths, and the sheaths 24 are taken out from the tank 21 at a predetermined time interval and after the iron oxides are removed, the sheaths 24 are attached to the upper portion of the tank 21 again.

EXAMPLE III

Figure 6:
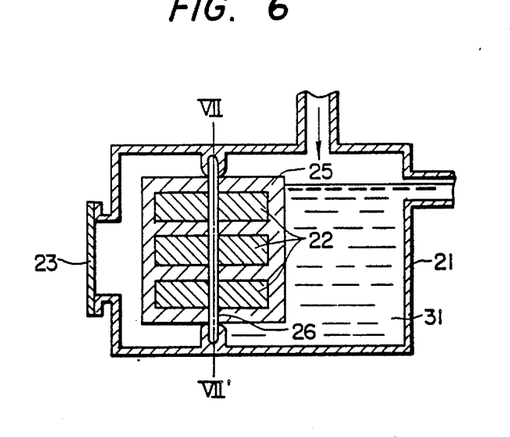
FIG. 6 is a sectional view illustrating still another embodiment of the apparatus for removing iron oxides according to the present invention.
Figure 7:
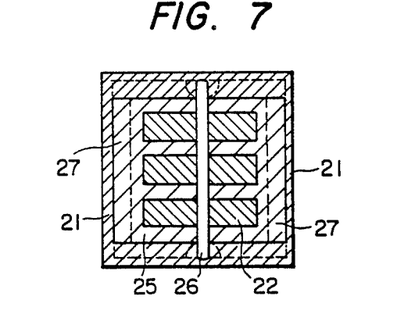
FIG. 7 is a view showing the section taken along the central line VII—VII' in FIG. 6.
Figure 8:
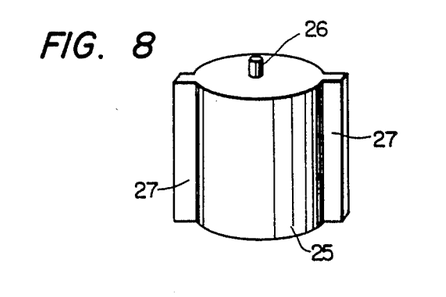
FIG. 8 is a perspective view showing cylinder 25, shaft 26 and vane 27 of the iron oxide-removing apparatus shown in FIG. 6.

Still another embodiment of the present invention is illustrated in FIG. 6. FIG. 7 is a view showing the central line VII—VII' in FIG. 6. In the embodiment shown in FIG. 6, in the side portion of the drain tank 21, a non-magnetic cylinder 25 is secured to a rotation shaft 26 attached in the vertical direction. Permanent magnets 22 are disposed in the interior of the cylinder 25. As is shown in a perspective view of FIG. 8, left and right vanes 27 are attached to the peripheral surface of the cylinder 25 along the axial direction, so that the vanes 27 are brought into sliding contact with the inner circumferential surface of the drain tank 21. In the case where two right and left vanes 27 are brought close to the inner circumferential surface of the drain tank 21 as shown in FIG. 6, iron oxides in the drain 31 are captured on the peripheral surface of the cylinder 25 in the semi-circuit portion on the right side of the drain tank 21. When the cylinder 25 is turned along the distance corresponding to the semi-circle while bringing the vanes 27 into sliding contact with the inner circumferential surface of the drain tank 21, an isolated chamber is formed in the left portion of FIG. 6. Then, a lid 23 is taken out and the iron oxides adhering to the cylinder 25 are removed to effect cleaning of the cylinder 25. Accordingly, if the present embodiment is adopted, capture and removal of iron oxides in the drain 31 can be performed continuously without stopping the operation of the electric power plant.

EXAMPLE IV

Figure 9:
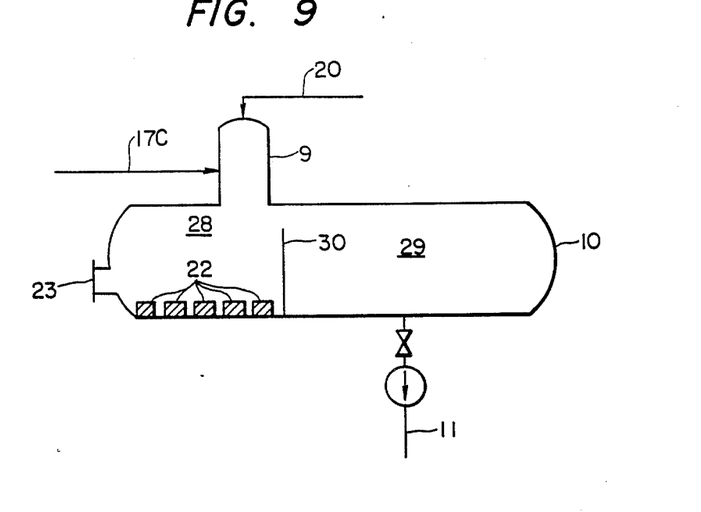
FIG. 9 is a schematic diagram illustrating still another embodiment of the apparatus for removing iron oxides according to the present invention.

FIG. 9 illustrates still another embodiment of the present invention in which a permanent magnet is disposed in the air separator water tank 10. A feed water pipe 20 connected to the low pressure feed water heater is connected to the upper portion of the air separator 9, and a drain pipe line 17C is connected to the side portion of the air separator 9, while the other end of the pipe line 17C is connected to the high pressure feed water heater. The lower portion of the air separator 9 is communicated with the air separator water tank 10, and an overflow plate 30 is disposed substantially at the center of the air separator water tank 10 so that feed water overflows from the upper portion and the air separator water tank 10 is divided into water chambers 28 and 29. In FIG. 9, reference numerals 11 and 23 represent a feed water pipe and a water tank lid, respectively. A number of permanent magnets 22 are disposed in the bottom portion of the water chamber 28 of the air separator water tank 10 having the above-mentioned structure.

The high iron content drain from the high pressure feed water heater is combined with feed water introduced from the low pressure feed water heater, and the combined water is deaerated and made resident in the water chamber 28. In the water chamber 28, dissolved iron carried from the low pressure feed water heater and iron formed in the drain pipe line 17 connected to the high pressure feed water heater are captured by the permanent magnets 22, and high quality feed water flows into the water chamber 29 through the overflow plate 30 and is then introduced into the high pressure feed water heater 13A through the feed water pipe 11 by the feed water pump 12. The permanent magnets having the iron component captured therein are taken out from the tank by opening the water tank lid 23.

In permanent magnets, there is ordinarily observed a so-called aging phenomenon in which the flux density is reduced with the lapse of time under certain conditions. This aging, however, has a linear relation to the logarithm of the time and the change by this aging is very small and is not practically significant in the present invention. Furthermore, in permanent magnets, demagnetization is caused by the structural change of the magnet, shocks, mechanical strains and vibrations and the like. When this demagnetization is taken into account, it is most preferred in the present invention that a ferrite magnet be used as the permanent magnet. The temperature of the drain in the high pressure feed water heater drain pipe line or the temperature of feed water in the water chamber 28 of the air separator water tank 10 is about 150° to about 170° C. Accordingly, it is indispensable that the Curie point (the temperature at which the magnet loses the magnetic characteristics thereof) of the permanent magnet should be higher than the temperature of the drain in the high pressure feed water heater drain pipe line 17C or the temperature of feed water in the water chamber 28 of the air separator water tank 10. The Curie point of the ferrite magnet is 450° C., which is much higher than the temperature of the drain or feed water, and the ferrite magnet is hardly demagnetized in the present invention. Accordingly, the ferrite magnet is used especially effectively in the present invention.

The effect of capturing iron oxides by a permanent magnet will now be described with reference to the following Experiment.

Figure 10:
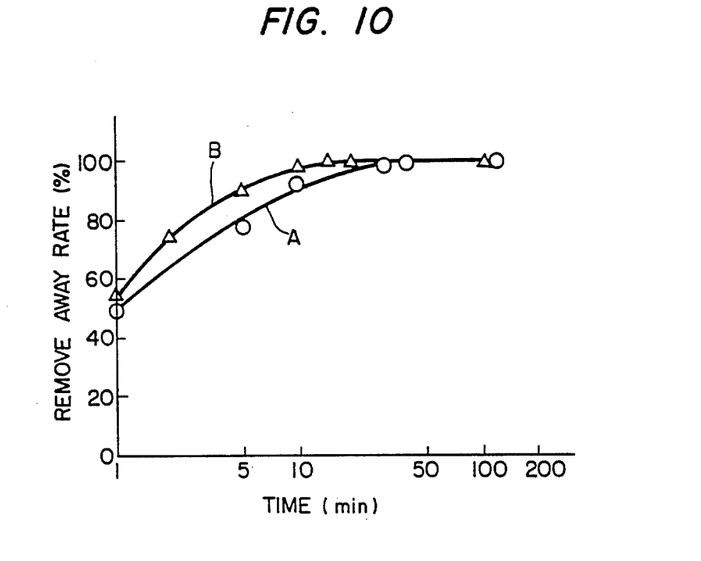
FIG. 10 is a graph showing the results of the experiment conducted according to the present invention.

EXPERIMENT $Fe_3O_4$ of the reagent grade and iron oxides (formed mainly of $Fe_3O_4$) collected from a high pressure feed water heater in a certain thermoelectric power plant are suspended in aqueous ammonia in a water tank, and the relation between the ratio of removal of the iron oxides by a permanent magnet and the time is examined to obtain the results shown in FIG. 10.

More specifically, a water tank provided with a Ba-ferrite type permanent magnet of 3 Koro-gauss is connected to a water tank charged with dilute aqueous ammonia having a pH value of 9.2, in which iron oxides are suspended at 10 ppm, through a pump and a flow meter. In each water tank, a light source is disposed on one side and an illuminometer is disposed on the other side, and the removal ratio is determined from the transparency of the liquid. The temperature of the liquid is adjusted to 90° C. by a heater and a temperature adjuster, and the liquid is circulated at an in-pipe flow rate of 60 l/hr. As is seen from FIG. 10, the ratio of removal of $Fe_3O_4$ of the reagent grade in the water tank charged with $Fe_3O_4$ of the reagent grade (curve A in FIG. 10) is increased with the lapse of time and is elevated to 100% within about 40 minutes. The iron oxide removal ratio in the water tank charged with the iron oxides from the high pressure feed water heater (curve B in FIG. 10) is elevated to 100% within about 15 minutes. Namely, it will readily be understood that $Fe_3O_4$ of the reagent grade is substantially attracted to the permanent magnet by circulating the liquid for 40 minutes and the iron oxides collected from the high pressure feed water heater are substantially attracted to the permanent magnet by circulating the liquid for 15 minutes. The reason why the iron oxides collected from the high pressure feed water heater are attracted to the permanent magnet more rapidly than $Fe_3O_4$ of the reagent grade is believed to be that since the iron oxides are formed by corrosion of a steel material under high temperature and high pressure conditions, minute amounts of easily magnetizable substances (such as nickel) are incorporated in $Fe_3O_4$ as the main component.

In the thermoelectric power plant shown in FIG. 1, the apparatuses illustrated in Examples I through IV are used for removal of iron oxides, and the iron concentrations are measured to obtain the results shown in Table 1. In each of Examples I through III, the iron concentration is measured at the outlet of the drain tank, and in Example IV, the iron concentration is measured at the outlet of the air separator water tank. Also in the case where the permanent magnet is not attached, the iron concentration is measured (Comparative Example).

TABLE 1

| Example No. | Iron Concentration (ppb) |
|---|---|
| I | 1-5 |
| II | 1-3 |
| III | 1-3 |
| IV | 0.2-1 |
| Comparative Example | 5-18 |

From the results shown in Table 1, it will readily be understood that in each of Examples I through IV, the iron concentration is drastically reduced and iron oxides are effectively captured by the permanent magnet.

As will be apparent from the foregoing description, according to the present invention, iron oxides in feed water and condensed water systems of an electric power plant can be removed at a high efficiency and good quality boiler feed water can be obtained, and therefore, the efficiency of the electric power plant can be enhanced.

What is claimed is:

1. An apparatus for removing iron oxides from water of a feed water and condensed water system of an electric power plant, said system comprising a boiler for generating steam, a turbine connected to the boiler and actuated by the steam, a condenser for condensing the steam operatively associated with the turbine, a hot well for storing the condensed water, means for desalting the condensed water removed from said hot well, a low pressure feed water heater for heating the condensed water obtained from said desalting means, an air separator for separating air from the condensed water, an air separator water tank for storing the condensed water taken from said air separator, a high pressure feed water heater for heating the condensed water obtained from said air separator water tank, a drain pipe line for feeding drain from said high pressure feed water heater into said air separator, and means for connecting said boiler, said turbine, said condenser, said hot well, said desalting means, said low pressure feed water heater, said air separator, said air separator water tank, said high pressure feed water heater and said boiler in fluid communication; said apparatus comprising permanent magnetic attracting means for removing iron oxides contained in water in a high pressure feed water heater drain pipe line system including said drain pipe line, said air separator and said air separator water tank, said permanent magnetic attracting means being arranged in said air separator water tank.

2. An apparatus as set forth in claim 1, wherein said permanent magnetic attracting means comprises a non-magnetic cylinder and a plurality of permanent magnets arranged in said non-magnetic cylinder.

3. An apparatus as set forth in claim 2, wherein said non-magnetic cylinder is rotatable and has vanes arranged on the periphery thereof, said non-magnetic cylinder being positioned in said air separator water tank for receiving drain water from which iron oxides are to be removed.

4. An apparatus as set forth in claim 1, wherein said connecting means connects said boiler, said turbine, said condenser, said hot well, said desalting means, said low pressure feed water heater, said air separator, said air separator water tank, said high pressure feed water heater and said boiler in a cyclic, series arrangement whereby feed water is introduced into said boiler via said condenser, said hot well, said desalting means, said low pressure feed water heater, said air separator, said air separator water tank, and said high pressure feed water heater and steam generated by said boiler is introduced into said turbine and then condensed in said condenser.

5. An apparatus as set forth in claim 4, wherein said air separator water tank includes a water chamber positioned to receive water from said air separator and said permanent magnetic attracting means is positioned in said water chamber below a water level whereby dissolved iron and iron oxides in the feed water entering said air separator water tank are captured by said permanent magnetic attracting means prior to the water being discharged from said air separator water tank.

6. An apparatus as set forth in claim 5, wherein said permanent magnetic attracting means comprises a plurality of permanent ferrite magnets located at the bottom of said water chamber.

7. An apparatus as set forth in claim 5, wherein said low pressure feed water heater and said high pressure feed water heater each comprise a plurality of series arranged indirect heat exchanger units having conduit means through which the feed water is passed and in which the feed water is heated by air taken via a bleed line from said turbine, each of said units of said low pressure feed water heater and of said high pressure feed water heater having a drain pipe, the drain pipes of said high pressure feed water heater being arranged in said drain system to discharge drain water into said air separator and the drain pipes of said low pressure feed water heater comprising a drain system arranged to discharge drain water into the heated conduit means of said low pressure feed water heater.

8. An apparatus for removing iron oxides from water of a feed water and condensed water system of an electric power plant, said system comprising a boiler for generating steam, a turbine connected to the boiler and actuated by the steam, a condenser for condensing the steam operatively associated with the turbine, a hot well for storing the condensed water, means for desalting the condensed water received from said hot well, a low pressure feed water heater for heating the condensed water obtained from said desalting means, an air separator for separating air from the condensed water, an air separator water tank, a high pressure feed water heater for heating the condensed water obtained from said air separator water tank, a drain pipe line for feeding drain from said high pressure feed water heater into said air separator, and means for connecting said boiler, said turbine, said condenser, said hot well, said desalting means, said low pressure feed water heater, said air separator, said air separator water tank, said high pressure feed water heater, and said boiler in fluid communication; said apparatus comprising permanent magnetic attracting means for removing iron oxides contained in water in a high pressure feed water heater drain pipe line system including said drain pipe line, a drain tank disposed on said drain pipe line, said air separator and said air separator water tank, said permanent magnetic attracting means being arranged in said drain tank.

9. An apparatus as set forth in claim 8, wherein said permanent magnetic attracting means comprises a non-magnetic cylinder and a plurality of permanent magnets arranged in said non-magnetic cylinder.

10. An apparatus as set forth in claim 8, wherein said non-magnetic cylinder is rotatable and has vanes arranged on the periphery thereof, said non-magnetic cylinder being positioned in said drain tank for receiving drain water from which iron oxides are to be removed.

11. An apparatus as set forth in claim 8, wherein said connecting means connects said boiler, said turbine, said condenser, said hot well, said desalting means, said low pressure feed water heater, said air separator, said air separator water tank, said high pressure feed water tank and said boiler in a cyclic, series arrangement whereby feed water is introduced into said boiler via said condenser, said hot well, said desalting means, said low pressure feed water heater, said air separator, said air separator water tank and said high pressure feed water heater and steam generated by said boiler is introduced into said turbine and then condensed in said condenser.

12. An apparatus as set forth in claim 11, wherein said magnetic attracting means is positioned in said drain tank below a water level therein whereby dissolved iron and iron oxides in the drain water entering in said drain tank are captured by said permanent magnetic attracting means prior to the drain water being discharged from said drain tank into said air separator.

13. An apparatus as set forth in claim 12, wherein said permanent magnetic attracting means comprises a plurality of permanent ferrite magnets located within said drain tank.

14. An apparatus as set forth in claim 12, wherein said low pressure feed water heater and said high pressure feed water heater each comprise a plurality of series arranged indirect heat exchanger units having conduit means through which the feed water is passed and in which the feed water is heated by air taken via a bleed line from said turbine, each of said units of said low pressure feed water heater and of said high pressure feed water heater having a drain pipe, the drain pipes of said high pressure feed water heater discharging via said drain pipe line into said drain tank and the drain pipes of said low series feed water heater comprising a drain system arranged to discharge drain water into the heated conduit means of said low pressure feed water heater.

15. An apparatus for removing iron oxides from water of a feed water and condensed water system of an electric power plant, said system comprising a boiler for generating steam; a turbine connected to the boiler and actuated by the steam; a condenser for condensing the steam operatively associated with the turbine; a hot well for storing the condensed water; means for desalting the condensed water received from said hot well; a low pressure feed water heater for heating the condensed water obtained from said desalting means; an air separator for separating air from the condensed water; an air separator water tank for storing the condensed water taken from said air separator; a high pressure feed water heater for heating the condensed water obtained from said air separator water tank; a drain pipe line for feeding drain from said high pressure feed water heater through a drain tank into said air separator; and means for connecting said boiler, said turbine, said condenser, said hot well, said desalting means, said low pressure feed water heater, said air separator, said air separator water tank, said high pressure feed water heater and said boiler in fluid communication; wherein a plurality of permanent magnet blocks are placed in said water tank of said air separator or in said drain tank in such a manner that iron oxides contained in the form of magnetite ($Fe_3O_4$) in said condensed water flowing through said water tank of said air separator or said drain tank is magnetically trapped by said permanent magnet blocks.

16. An apparatus for removing iron oxides from feed water and condensed water of an electric power plant according to claim 15, wherein said magnetic blocks are covered with non-magnetic covers.

17. An apparatus for removing iron oxides from feed water and condensed water of an electric power plant according to claim 15, wherein said magnetic blocks are immersed in the condensed water in said water tank of said air separator or in the water in said drain tank.

18. An apparatus for removing iron oxides from water of a feed water and condensed water system of an electric power plant, which comprises:
   a boiler for generating steam;
   a turbine connected to the boiler and actuated by the steam;
   a condenser for condensing the steam operatively associated with the turbine;
   a hot well for storing the condensed water;
   means for desalting the condensed water received from said hot well;
   a low pressure feed water heater for heating the condensed water obtained from said desalting means;
   an air separator for separating air from the condensed water;
   an air separator water tank for storing the condensed water taken from said air separator;
   a high pressure feed water heater for heating the condensed water obtained from said air separator water tank;
   a drain pipe line for feeding drain from said high pressure feed water heater into said air separator; and
   means for connecting said boiler, said turbine, said condenser, said hot well, said desalting means, said low pressure feed water heater, said air separator, said air separator water tank and said high pressure feed water heater in fluid communication;
   wherein a plurality of permanent magnet blocks are placed in said water tank of said air separator in such a manner that iron oxides contained in the form of magnetite in said condensed water flowing through said water tank of said air separator is magnetically trapped by said permanent magnet blocks.

19. An apparatus for removing iron oxides from feed water and condensed water of an electric power plant according to claim 18, wherein said magnetic blocks are covered with non-magnetic covers.

* * * * *